United States Patent [19]

Whitesel et al.

[11] Patent Number: 4,989,095
[45] Date of Patent: Jan. 29, 1991

[54] CONTROLLING METHOD FOR TWO DIMENSIONAL CHARGE-COUPLED DEVICE IMPROVED IN ANTI-BLOOMING CAPABILITY

[75] Inventors: Warren Whitesel; Akiyoshi Kohno, both of Tokyo, Japan

[73] Assignee: NEC Corporation, Japan

[21] Appl. No.: 365,310

[22] Filed: Jun. 13, 1989

[30] Foreign Application Priority Data

Jun. 15, 1988 [JP] Japan ................................ 63-148769

[51] Int. Cl.$^5$ .............................................. H04N 3/14
[52] U.S. Cl. .............................................. 358/213.19
[58] Field of Search ............... 358/213.19, 228, 213.31, 358/213.26

[56] References Cited

U.S. PATENT DOCUMENTS

| | | |
|---|---|---|
| 4,322,753 | 3/1982 | Ishihara et al. ................. 358/213.19 |
| 4,783,702 | 11/1988 | Sone et al. ...................... 358/213.19 |
| 4,800,435 | 1/1989 | Ikeda et al. ..................... 358/213.19 |
| 4,834,474 | 6/1989 | Suzuki ............................ 358/228 |
| 4,856,033 | 8/1989 | Hirota ............................ 358/213.19 |
| 4,866,528 | 9/1989 | Yamazaki et al. ............... 358/213.19 |

Primary Examiner—Stephen Brinich
Attorney, Agent, or Firm—Laff, Whitesel, Conte & Saret

[57] ABSTRACT

A controlling method for a charge-coupled device according to the present invention decreases the amount of ineffectual electric charges by applying a photo shield film over photo sensing elements or a semiconductor substrate with a certain voltage level, then accumulating effectual electric charges in the presence of an optical radiation into the photo sensing elements in applying a different voltage level to the photo shield film for promoting the production of the effectual electric charges while the reduced ineffectual electric charges are swept into the overflow drain, then transferring the effectual electric charges to the multiple-stage horizontal shift register.

17 Claims, 7 Drawing Sheets

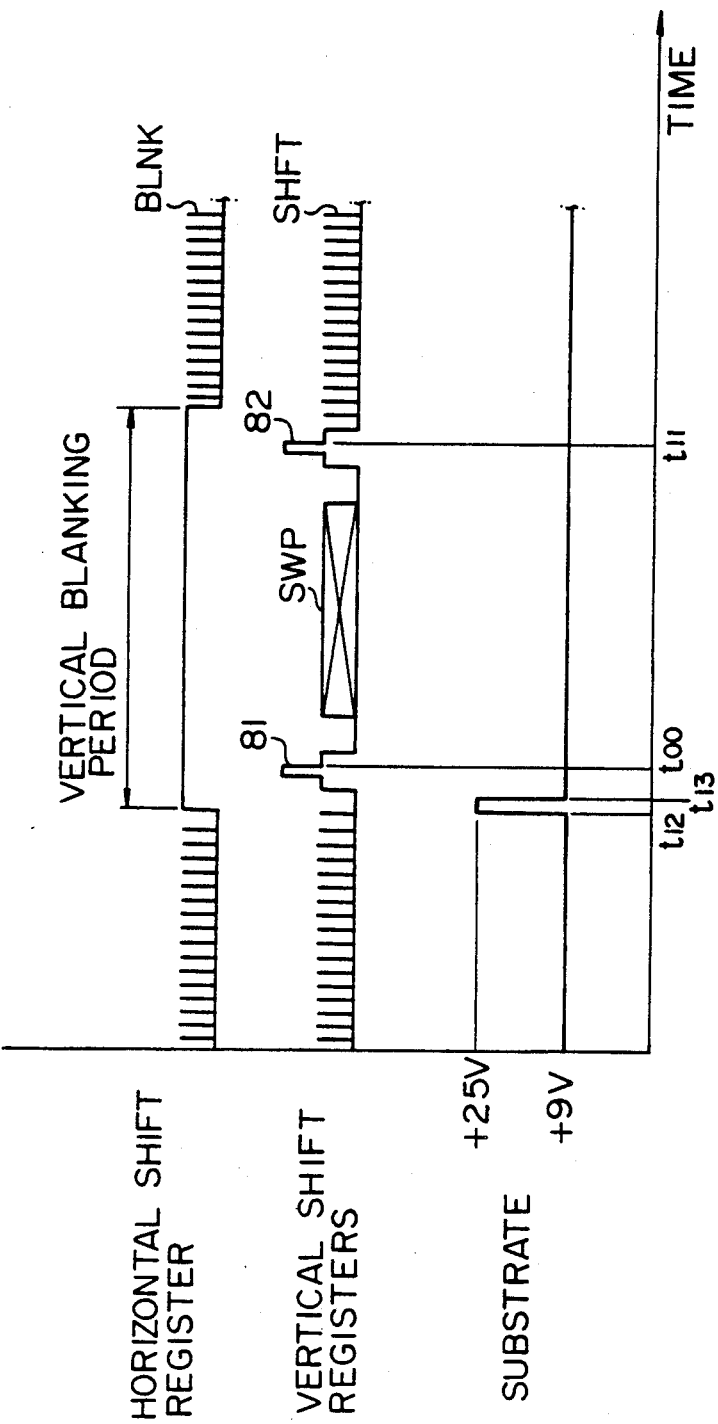

CONTROLLING METHOD FOR TWO DIMENSIONAL CHARGE-COUPLED DEVICE IMPROVED IN ANTI-BLOOMING CAPABILITY

FIELD OF THE INVENTION

This invention relates to a charge-coupled device (which is abbreviated as "CCD") and, more particularly, to a controlling method for a two dimensional charge coupled device of the interlined transfer type.

DESCRIPTION OF THE RELATED ART

A typical charge-coupled device of the interlined type largely comprises a plurality of photo-sensitive elements such as photo-diodes arranged in rows and columns, vertical shift registers interlined with adjacent two columns of the photo-sensitive elements, and a horizontal shift register coupled at one end to the vertical shift registers When an optical image is fallen onto the photo-sensitive elements, the photo-sensitive elements respectively produces electric charges the amounts of which are depending on the intensities of the parts of the optical image. The electric charges are transferred from the photo-sensitive elements to the vertical shift registers which in turn transfer the electric charges to the horizontal shift register. The electric charges produced by the photo-sensitive elements are successively transferred from the horizontal shift register to the outside thereof during a time period between two vertical blanking time periods. According to the NTSC (National Television System Committee) color system, an effective accumulation time period is selected to be a sixtieth second for converting an optical image into the electric charges, so that the charge-coupled device is capable of reproduce the optical image without blurring in so far as the optical image is provided from the static or a low speed moving object. However, a distinctive image is hardly reproduced from an optical image from a highspeed moving object due to the relatively long effective accumulation time period.

In order to provide a solution of the problem described above, an "electronic shutter" is proposed so as to shorten the effective accumulation time period. The electronic shutter is described by Hiromi Okumura in "TECHNICAL REPORT, NATIONAL CCD SOLID IMAGER", Video alpha published by Photo Industry Publishing Company, August 1987, pages 145 to 149. For better understanding of the present invention, the technical report is summarized hereinbelow with FIGS. 1 and 2.

Referring to FIG. 1, the charge-coupled device largely comprises photo diodes 1 arranged in rows and columns, vertical shift registers 2 interlined with the adjacent two columns of the photo diodes, a horizontal shift register 3 coupled to the vertical shift registers 2, and a drain provided on the opposite side to the horizontal shift register 3. Each of the photo diodes 1 is represented by a small rectangle.

In an ordinary charge-coupled device, a series of vertical driving pulses 4 takes place at a certain interval, and all of the electric charges are transferred to the outside thereof in a driving period between two vertical blanking time periods 6 as shown in FIG. 2. However, the charge-coupled device reported by Okumura intermittently produces two read-out pulses 7 and 8 in a single vertical blanking time period 6, and reverse transferring pulses 9 are further produced between the two read-out pulses 7 and 8.

When the first read-out pulse 7 takes place, ineffectual electric charges are discharged from the photo diodes 1 to the vertical shift registers 2, and the ineffectual electric charges are reversely swept into the drain 4 through the vertical shift registers 2 in response to the reverse transferring pulses 9. While sweeping the ineffectual electric charges into the drain 4, the photo diodes 1 accumulate fresh or effectual electric charges produced in the presence of an optical image. The electric charges thus accumulated in the photo diodes 1 are discharged to the vertical shift registers 2 in response to the second read-out pulse 8, and are successively transferred to the outside thereof in cooperation with the horizontal shift register 3. The vertical driving pulses 10 are produced in a driving time period between the two vertical blanking time periods 6 at a certain time interval. The photo diodes 1 are exposed to the optical image for an effective accumulation time period t1 between the two read-out pulses 7 and 8, and the shutter speed is then calculated from the effective accumulation time period t1. In this instance, the effective accumulation time period t1 is about a thousandth second. The effective accumulation time period t1 is thus shrunk to the small value, the charge-coupled device can reproduce an optical image from a high-speed moving object.

All of the above behaviors should be completed in the vertical blanking time period 6, and, for this reason, the charge-coupled device illustrated in FIG. 1 hardly increases the effective accumulation time period to a value greater than a thousandth second.

A charge-coupled device illustrated in FIG. 3 is proposed and aims at extension of the effective accumulation time period t1. The charge-coupled device shown in FIG. 3 largely comprises an interlined sensing-and-transferring stage 21, a horizontal shift register 22, an accumulating stage 23 provided between the interlined sensing-and-transferring stage 21 and the horizontal shift register 22, and a drain 24 provided on the opposite side of the accumulating stage 23. The charge-coupled device thus arranged completes the delivery of the ineffectual electric charges in the previous driving period, and only the reverse transferring pulses 9 and the second read-out pulse 8 take place in the vertical blanking time period 6. For this reason, the effective accumulation time period t1 is prolonged to a two hundreds and fiftieth second.

In a charge-coupled device with a high speed shutter, the ineffective accumulation time period is four times to sixteen times longer than the effective accumulation time period t1, and, accordingly, the ineffectual electric charges are drastically increased to a saturation level which serves as a criterion of production of the blooming phenomenon. The saturation level is related to a blooming control voltage level.

A problem is encountered in the prior art charge-coupled device with the electronic shutter in that the electronic charges are liable to remain in the photo-sensitive elements after the sweeping operation of the ineffectual electronic charges. In detail, since the sweeping operation as well as the reading-out operation to the vertical shift registers should be completed in the vertical blanking time period, the ineffectual electric charges are transferred at about 800 KHz higher than the ordinary vertical transferring operation of the effective electric charges. The electrodes of the vertical shift registers 2 are relatively large in resistance and in capacitance due to double or tipple structure of polysilicon, and, for this reason, the driving pulses are delayed and deformed at the high frequency transferring operation. Thus, the driving pulses are delayed and deformed, so that the vertical shift registers deteriorate in the charge transferring capacity. In other words, the amount of the ineffectual electric charges transferred to the drain is decreased to a half or a third, leaving residual charges in the photo-sensitive elements. These residual charges are causative of electric signals over the saturation level, and the electric signals produces a white small jamming image.

If the relaying operation from stage to stage repeats certain times greater than the number of the stages of each vertical shift register, more ineffectual electric charges are swept into the drain, however, the length of the vertical blanking time period t1 sets a limitation on the number of the relaying operations for the sweeping operation. This results in insufficient sweeping operation. The wider screen the charge-coupled device is associated, the more residual charges the charge-coupled device holds. If the blooming control voltage is regulated to a high level, there is a trade-off between the dynamic range and the amount of the residual charges

SUMMARY OF THE INVENTION

It is therefore an important object of the present invention to provide a charge-coupled device which produces an image signal less affected by the residual charges.

It is another important object of the present invention to provide a charge-coupled device in which the residual charges are sufficiently swept into the drain.

To accomplish these objects, the present invention proposes to make the photo sensing elements less sensitive or less retainable in the ineffective accumulation time period.

In accordance with one aspect of the present invention, there is provided a controlling method for a charge-coupled device fabricated on a semiconductor substrate and comprising a plurality of photo sensing elements arranged in columns and operative to convert an optical radiation into electric charges, respectively, a multiple-stage horizontal shift register, an overflow drain, a plurality of multiple-stage vertical shift registers interlined with the columns of the photo sensing elements and operative to transfer the electric charges to one of the multiple-stage horizontal shift register and the overflow drain, and a photo shield film provided over the photo sensing elements in such a manner as to allow the optical radiation to fall on the photo sensing elements, the controlling method comprising the steps of a) accumulating effectual electric charges in the presence of the optical radiation into the photo sensing elements in applying a first voltage level to the photo shield plate for promoting the production of the effectual electric charges while ineffectual electric charges are swept into the overflow drain through the multiple-stage vertical shift registers in response to a first driving pulse signal, and b) transferring the effectual electric charges to the multiple-stage horizontal shift register in applying a second voltage level to the photo shield plate for restricting the production of the ineffectual electric charges in the photo sensing elements.

In accordance with another aspect of the present invention, there is provided a controlling method for a charge-coupled device fabricated on a semiconductor substrate and comprising a plurality of photo sensing elements arranged in columns and operative to convert an optical radiation into electric charges, respectively, a multiple-stage horizontal shift register, an overflow drain, a plurality of multiple-stage vertical shift registers interlined with the columns of the photo sensing elements and operative to transfer the electric charges to one of the multiple-stage horizontal shift register and the overflow drain, and a photo shield film provided over the photo sensing elements in such a manner as to allow the optical radiation to fall on the photo, sensing elements, the photo shield film being fixed to a certain voltage level, the controlling method comprising the steps of a) shifting the semiconductor substrate from a third voltage level to a fourth voltage level for reducing the amount of ineffectual electric charges in the photo sensing elements, thereby sweeping a part of the ineffectual electric charges to the overflow drain, b) recovering the semiconductor substrate from the fourth voltage level to the third voltage level, c) accumulating effectual electric charges in the presence of the optical radiation into the photo sensing elements in applying the third voltage level to the semiconductor substrate for promoting the production of the effectual electric charges while the residual ineffectual electric charges are swept into the overflow drain through the multiple-stage vertical shift registers, and d) transferring the effectual electric charges to the multiple-stage horizontal shift register.

BRIEF DESCRIPTION OF THE DRAWINGS

The features and advantages of a controlling method for a two dimensional charge-coupled device according to the present invention will be more clearly understood from the following description taken in conjunction with the accompanying drawings in which:

FIG. 9 is a diagram showing the waveforms of another set of essential signals applied to the charge-coupled device shown in FIG. 4.

DESCRIPTION OF THE PREFERRED EMBODIMENTS

Figure 1:
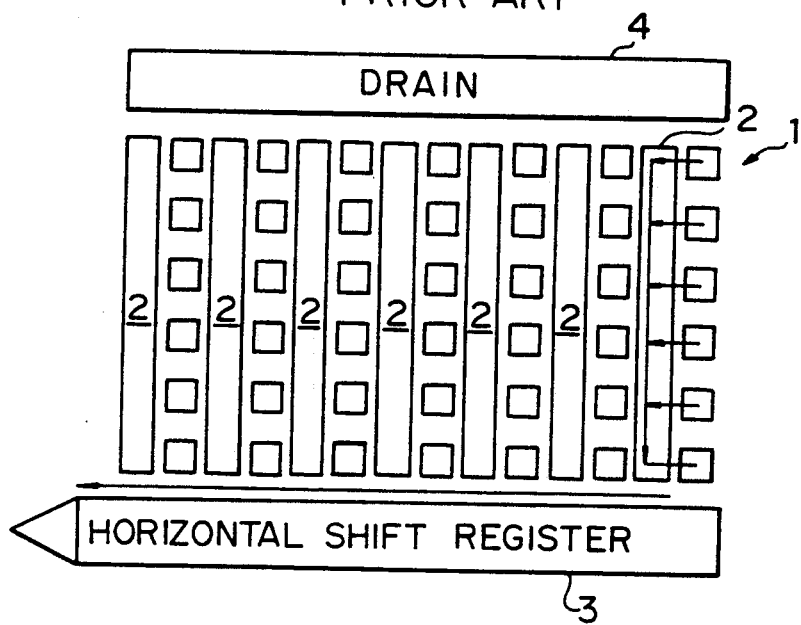
FIG. 1 is a block diagram showing the arrangement of a prior art charge-coupled device.
Figure 2:
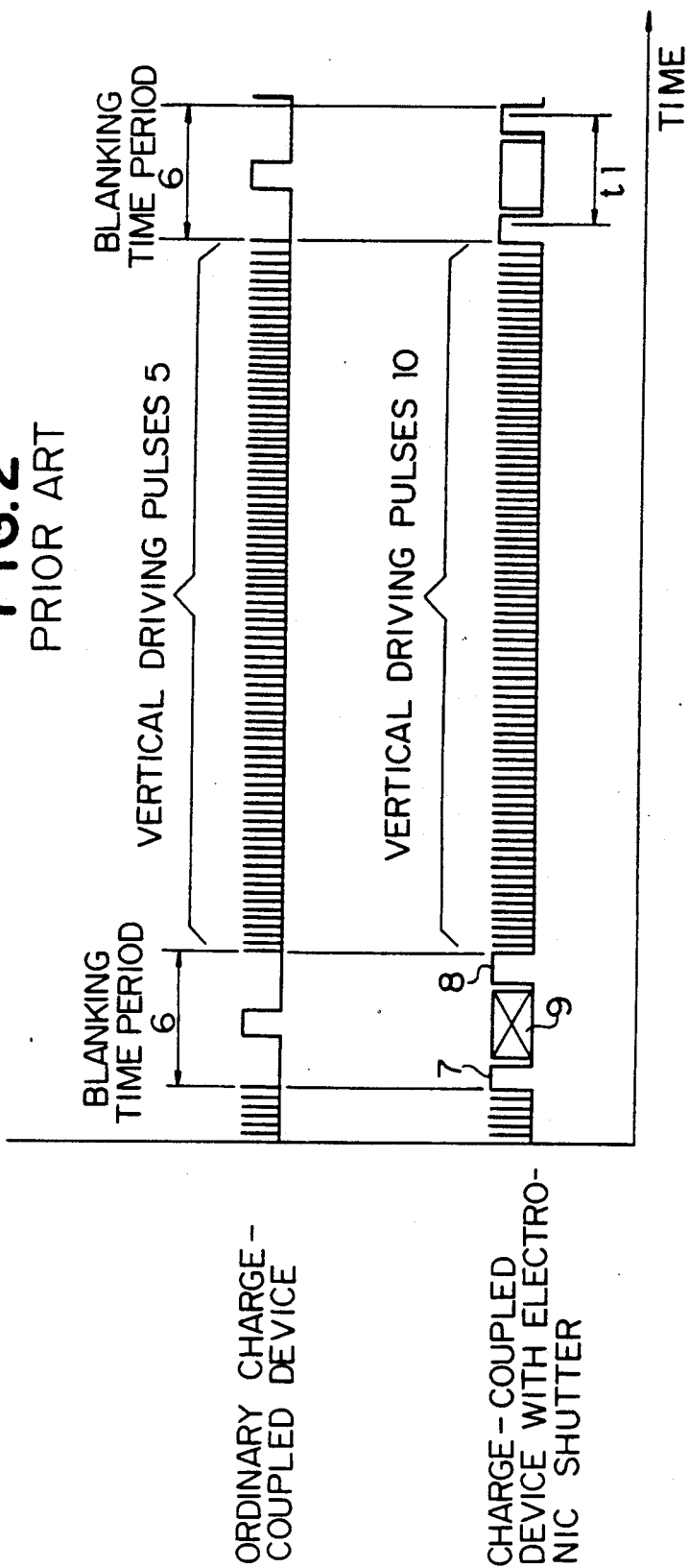
FIG. 2 is a diagram showing the waveforms of essential signals in a composite manner applied to the prior art charge-coupled device.
Figure 3:
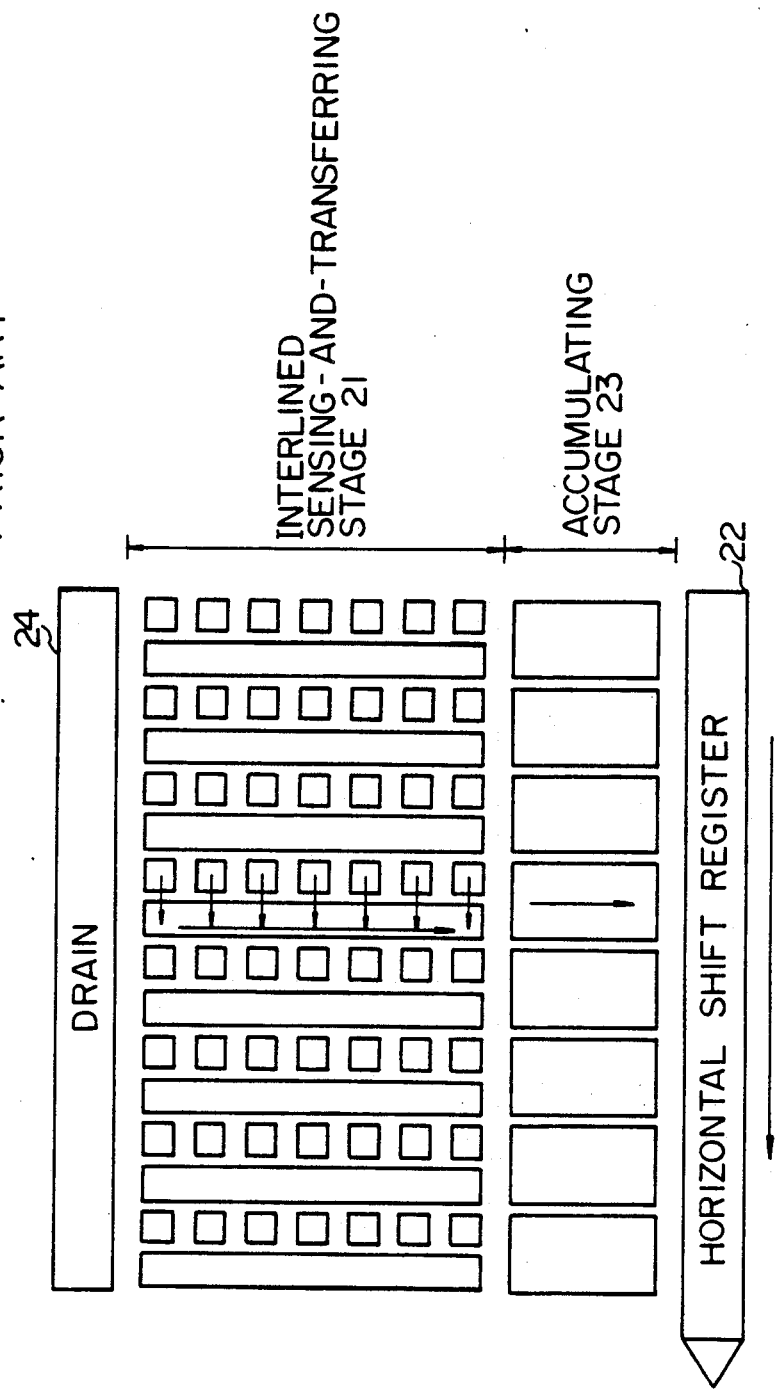
FIG. 3 is a block diagram showing the arrangement of another prior art charge-coupled device proposed for a solution of the problem inherent in the charge-coupled device shown in FIG. 1.
Figure 4:
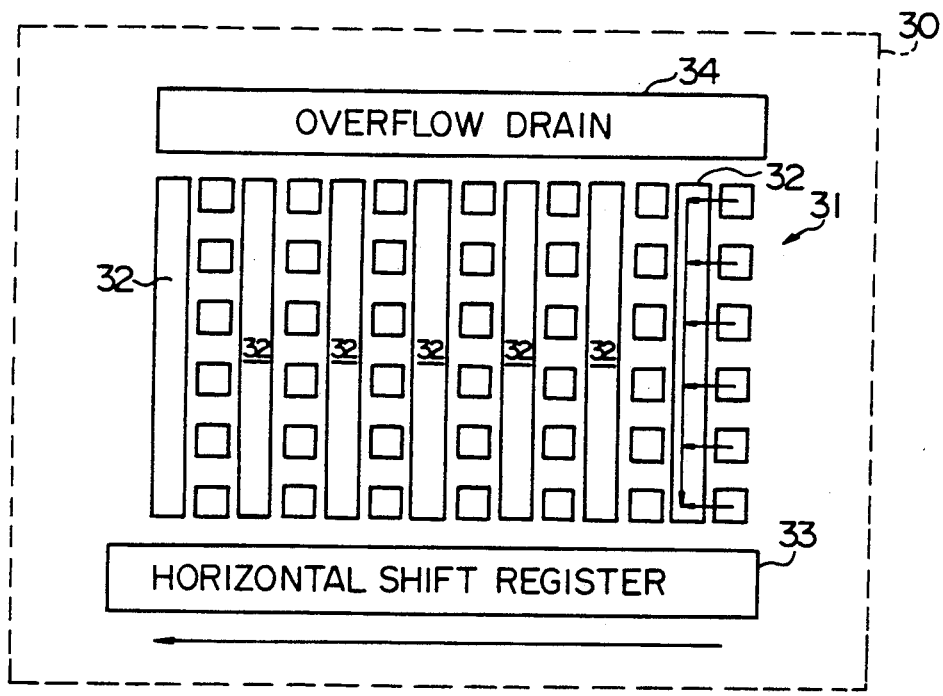
FIG. 4 is a block diagram showing the arrangement of a two-dimensional charge-coupled device to which the present invention appertains.

Referring first to FIG. 1 of the drawings, a two-dimensional charge-coupled device is fabricated on an n-type single semiconductor substrate 30 and largely comprises a plurality of photo-sensing elements 31 each corresponding to a pixel and arranged in rows and columns, a plurality of multiple-stage vertical shift registers 32 each interlined with adjacent two columns of the photo-sensing elements 31, a multiple-stage horizontal shift register 33 coupled to first output nodes of the vertical shift registers 32, and an overflow drain 34 coupled to second output nodes of the vertical shift registers 32 and provided at the opposite ends to the horizontal shift register 33. The two-dimensional charge-coupled device thus arranged is classified into the interlined type with the vertical overflow drain structure.

Figure 5:
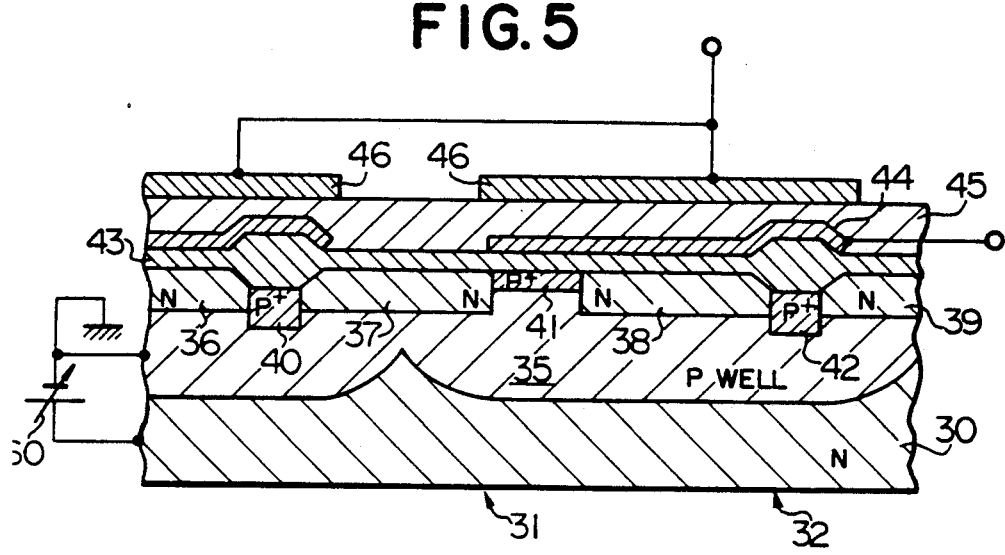
FIG. 5 is a cross sectional view showing the structure of a photo-sensitive element incorporated in the charge-coupled device illustrated in FIG. 4.

Turning to FIG. 5, each of the photo-sensing elements 31 is formed by a photo diode, and the vertical shift register 32 is of the vertical CCD register type Although the plural photo diodes and the plural vertical shift registers are fabricated on the semiconductor substrate 30, description is focused upon a single photo diode and a single vertical shift register In the n-type semiconductor substrate is formed a p-type well 35 where a plurality of n-type regions 36, 37, 38 and 39 are formed and isolated by p-type impurity regions 40, 41 and 42. The p-type well 35 is reversely biased with respect to the n-type substrate 30, and the reverse biasing voltage level is variable by means of a controller 60. The major surface of the substrate 31 is covered with an oxide film 3 which is transparent to an optical radiation. The optical radiation carries an optical image from an object. The oxide film 43 is partially covered with conductive strips 44 serving as electrodes of the vertical shift register 32, and the entire surface is overlain by an oxide film 45 which is also transparent to the optical radiation. On the oxide film 45 is provided a photo-shield film 46 which is supplied with an appropriate positive biasing voltage level.

The n-type region 37 and the p-type well 35 beneath the region 37 form in combination the photo diode, and the p-type impurity region 41 and the gate electrode 45 provide an input gate of the vertical shift register 32 bridging between the n-type region 37 and one of the n-type regions 38. The n-type regions 38 (only one of which is shown in the cross sectional view) are spaced apart from one another, and are respectively associated with the conductive strips or the gate electrodes 44 to form a plurality of transferring stages. The p-type impurity region 42 serves as a channel stopper between the vertical shift register 32 and the adjacent photo diode The p-type impurity region 41, the n-type regions 38, and the gate electrodes 44 form the vertical shift register 32. Each of the vertical shift registers 32 has 250 gate electrodes 44 provided in parallel to one another, and, accordingly, is provided with 250 transferring stages. Each transferring stage performs a single transferring operation with a vertical driving pulse SHFT , and the amount of the maximum electric charge transferred is tantamount to the output voltage level of about 0.9 volt at 15.75 KHz.

Figure 6:
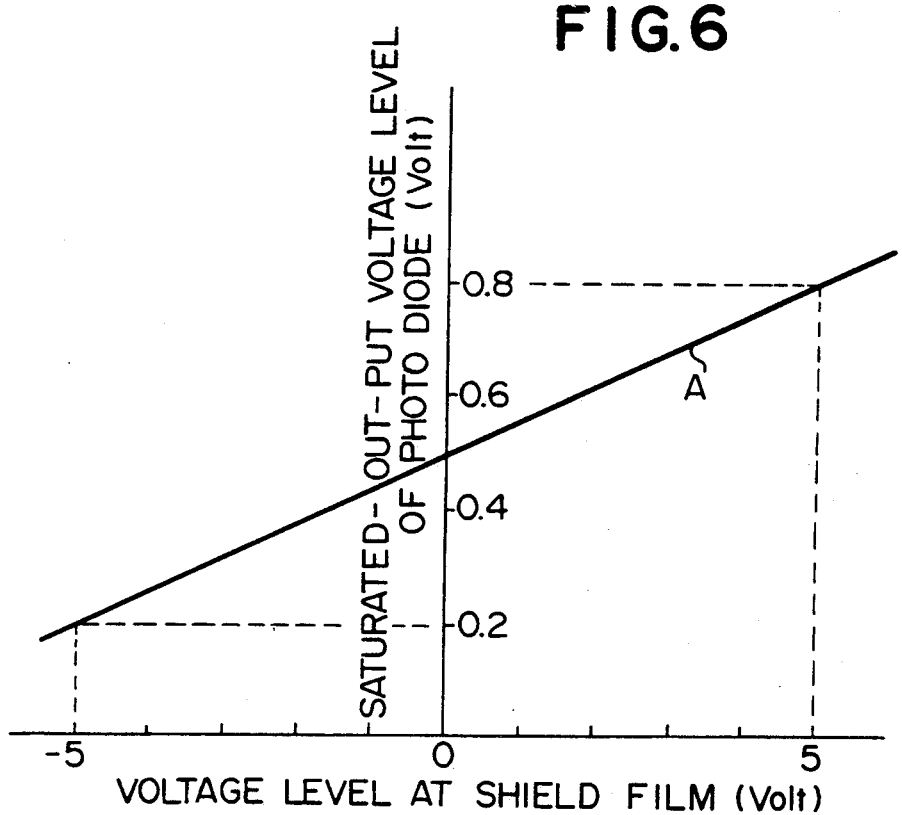
FIG. 6 is a graph showing the saturated output voltage level in terms of the voltage level at a photo shield plate incorporated in the charge-coupled device shown in FIG. 5.

The biasing voltage level directly affects the amount of the maximum electric charge produced by the photo diode forming each of the photo sensing elements 31, and is varied as the function indicated by plots A in FIG. 6. This is because of the fact that the lines of electric forces from the photo shield film 46 reach the surface of the photo diode and, accordingly, vary the voltage level of the surface The amount of the maximum electric charge affected by the biasing voltage level is also capable of being represented by an output voltage level delivered from the horizontal shift register of the charge-coupled device to the outside thereof. The output voltage level thus representing the amount of the maximum electric charge produced by each photo diode is hereinbelow referred to as "saturated output voltage level". The saturated output voltage level of the photo diode is further varied as the function indicated by plots B of FIG. 7 with respect to the voltage level at the semiconductor substrate 30 when a certain voltage level is fixedly applied to the photo shield film 46. When using the characteristics indicated in either FIG. 6 or 7, an electronic shutter of about a thousandth second is implemented by the charge-coupled device controlled by a method according to the present invention without any sacrifice of quality of an image reproduced on a screen.

Figure 8:
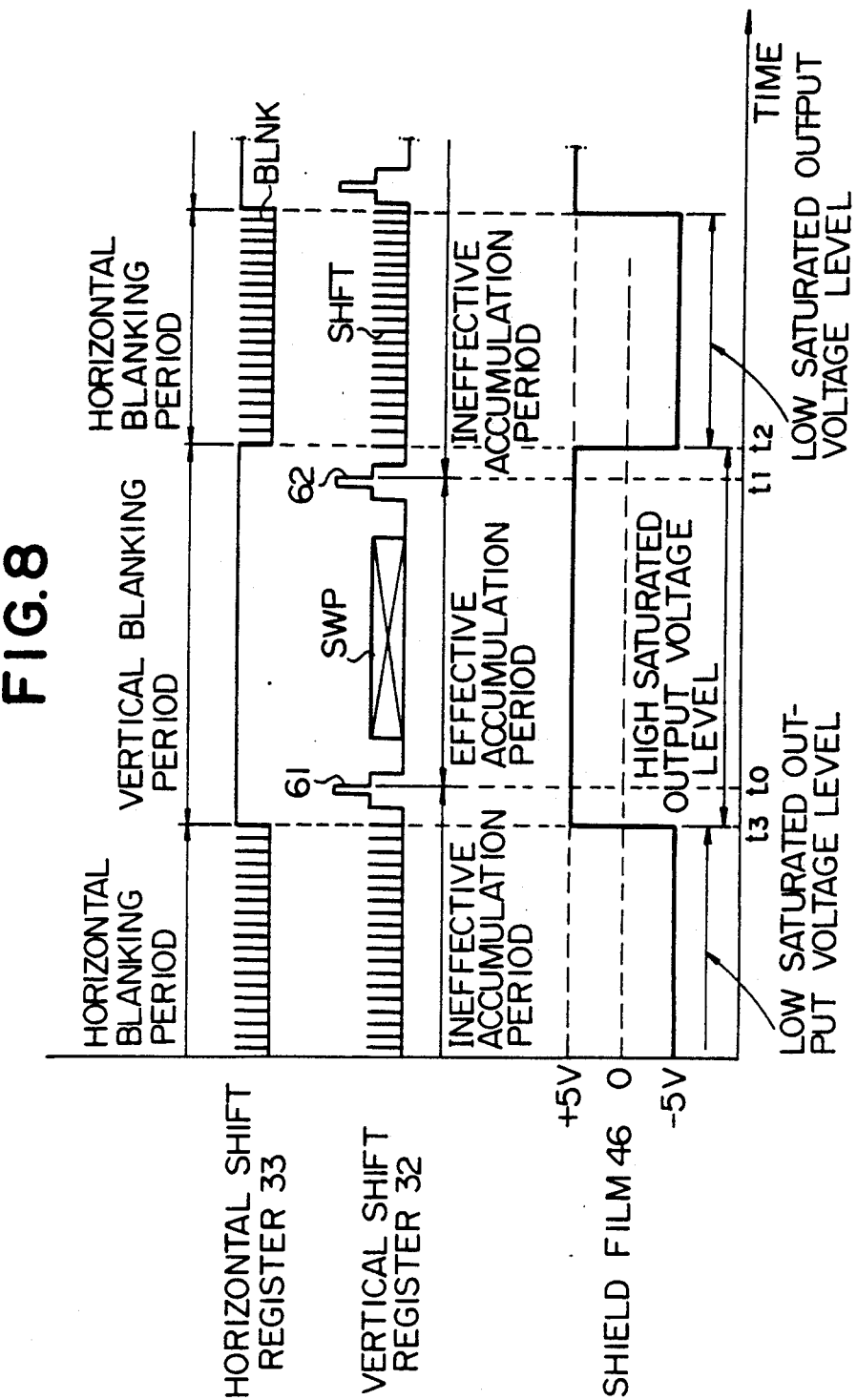
FIG. 8 is a diagram showing the waveforms of a set of essential signals applied to the charge-coupled device shown in FIG. 4.

Turning to FIG. 8 of the drawings, horizontal blanking periods and vertical blanking periods alternatively take place, and electric charges respectively produced by the photo sensing elements 31 are delivered in succession from the horizontal shift register 33 of the charge-coupled device to the outside thereof in a single read-out cycle. The read-out cycle has a single vertical blanking period followed by a signal horizontal blanking period. Two read-out pulses 61 and 62 are produced in each vertical blanking period, and a series of high speed vertical driving pulses SWP takes place between the two read-out pulses 61 and 62 for sweeping ineffectual electric charges into the overflow drain 34. Namely, when the first read-out pulse 61 takes place, the ineffectual electric charges accumulated in the photo sensing elements 31 are delivered to the vertical shift registers 32, and are transferred to the overflow drain 34 in the presence of the high speed vertical driving pulses SWP. While sweeping the ineffectual electric charges into the overflow drain 34, fresh effectual electric charges are respectively accumulated in the photo sensing elements 31 in the presence of the optical radiation fallen thereon, and the effectual electric charges are delivered to the vertical shift registers in response to the second read-out Pulse 62. In the horizontal blanking periods, the effectual electric charges accumulated in the effective accumulation period are transferred from the vertical shift registers 32 through the horizontal shift register 33 to the outside of the charge-coupled device, and ineffectual electric charges are accumulated in the photo-sensing elements 31, respectively.

As described hereinbefore, each of the vertical shift registers 32 has the two hundreds and fifty transferring stages, however, five hundreds of the transferring operations are achieved at the high speed driving frequency of about 800 KHz. At this high speed driving frequency, the amount of transferring charge in a single transferring operation is turned into an output voltage level of about 0.3 volt which is a third achieved by an usual vertical transferring operation for the effectual electric charge, and the amount of the transferring charges is measured for the photo diode around the center of the pixel array. The ineffectual electric charges are accumulated in each of the horizontal blanking periods, and the photo shield film 44 is negatively biased to −5 volts As will be understood from FIG. 6, the saturated output voltage level is about 0.2 volt at the negative biassing voltage level of about −5 volts. The saturated output voltage level of about 0.2 volt is low enough to perfectly be swept with the high speed driving frequency of about 800 KHz, because the amount of the transferring charge is estimated as about 0.3 volt as described hereinbefore. This results in that no residual electric charge is left in the photo sensing elements. After the first read-out pulse 61 is recovered at time t0, fresh effectual electric charges are accumulated in the photo sensing elements 31. While accumulating the effectual electric charges, the positive biasing voltage level of about +5 volts is applied to the photo shield film 44, and the saturated output voltage level is increased to about 0.8 volt with the biasing level of about +5 volts as will be seen from plots A of FIG. 6. Since the amount of the maximum transferring charge in the usual transferring operation is turned into about 0.9 volt, the saturated output voltage level of about 0.8 volt is slightly lower than the maximum transferring capacity of the vertical shift register, and, accordingly, a sufficiently wide dynamic range is established in the photo sensing elements. No residual electric charge is left in the photo sensing elements, and, for this reason, the blooming phenomenon is less liable to take place even if the wide dynamic range is established.

The effectual electric charges are read-out from the photo sensing elements 31 to the vertical shift registers 32 in the presence of the second read-out pulse 62. The vertical shift registers 32 and the horizontal shift register 33 are responsive to the driving pulses SHFT and blanking pulses BLNK, and the effectual electric charges are relayed from the vertical shift registers 32 through the horizontal shift register 33 to the outside of the charge-coupled device. In this period, the photo shield film 46 is lowered to the negative biasing voltage level of about −5 volts again, so that a relatively small amount of ineffectual electric charge is merely produced in each of the photo sensing elements.

The biasing voltage level is recovered to the negative value at time t2, and time t2 should be later than time t1 defining the trailing edge of the second read-out pulse 62. The recovery to the negative biasing voltage level is preferably adjusted in the vertical blanking period or the horizontal blanking period so as to prevent an optical image on the screen from some noises produced upon shifting. The ascent of the biasing voltage at time t3 is allowed to be later than the trailing edge of the first read-out pulse at time t0. However, it is desirable that time t3 is earlier than time t0, because the effective accumulation time period or the electronic shutter speed is proportional to the sensitivity. However, if a substantial amount of time takes place between the ascent of the biasing voltage level and the trailing edge of the first read-out pulse 61, undesirable ineffectual electric charges are produced therebetween, and the amount of the undesirable ineffectual electric charges can not be ignored due to the high saturated output voltage level. It is desirable to regulate the ascent of the biasing voltage level and the trailing edge of the first read-out pulse in such a manner that the time therebetween is equal to or less than a tenth of the effective accumulation time period. Time t3 should be fallen within the horizontal blanking time period or the vertical blanking time period in view of reduction in noise.

Figure 7:
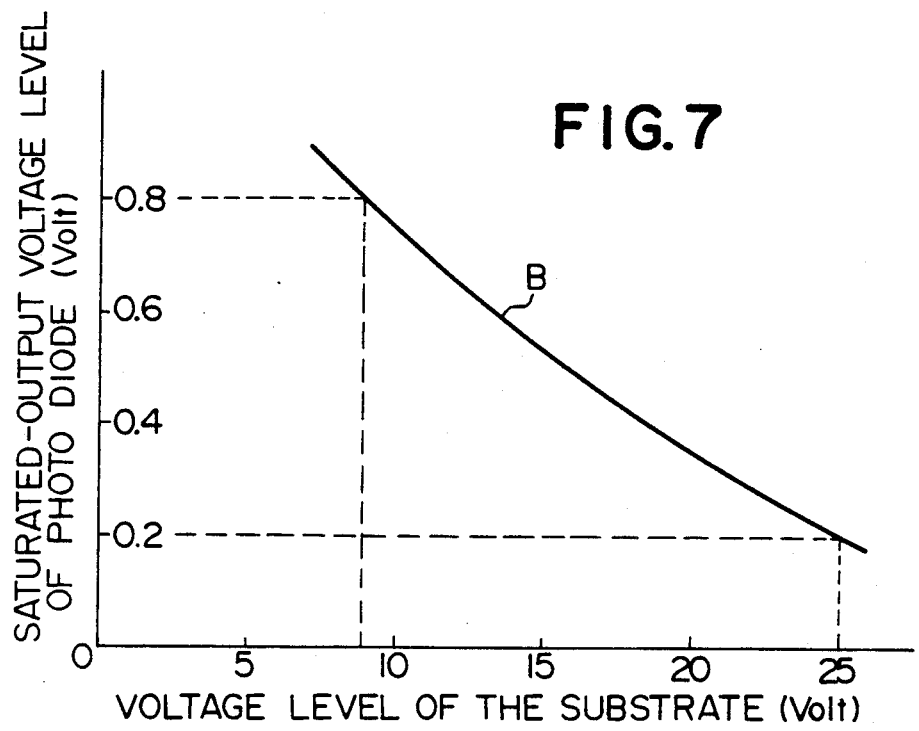
FIG. 7 is a graph showing the saturated output voltage level in terms of the voltage level at the substrate where the charge-coupled device shown in FIG. 5 is fabricated.

FIG. 9 illustrates another controlling method for a charge-coupled device according to the present invention This controlling method is based on the relationship between the saturated output voltage level and the voltage level of the substrate 30 shown in FIG. 7, and the accumulation time period of about a thousandth second is also achieved by the controlling method without any occurrence of the blooming phenomenon. In FIG. 9, the high-speed vertical driving pulses SWP, the blanking pulses BLNK and the vertical driving pulses SHFT are similar to those shown in FIG. 8, and first and second read-out pulses 81 and 82 takes place in each vertical blanking period.

In the ineffective accumulation period, the voltage level of about 9 volts is applied to the semiconductor substrate 30, however, the semiconductor substrate 30 goes up to about 25 volts at time t12 and is recovered to about 9 volts at time t13. The photo shield film 46 is fixed to about +5 volts. When the semiconductor substrate 30 is supplied with the high voltage level such as about 25 volts, the amount of the maximum accumulated charge in each photo sensing element is decreased to low level such as about 0.2 volt (represented by the saturated output voltage level.) At about 9 volts, each of the photo sensing elements 31 is capable of accumulating electric charges the amount of which is estimated to be about 0.8 volt, and, for this reason, the difference in the amount of the electric charge is discharged to the semiconductor substrate 30 through the vertical shift registers 32 and the overflow drain 34 during the time period between times t12 to t13. The amount of the electric charge transferred in each transferring operation is about 0.3 volt at about 800 KHz as described hereinbefore, so that the difference between the amounts of the electric charges are perfectly swept into the overflow drain 34. Times t12 and t13 takes place after the trailing edge of the second read-out pulse 82, but is earlier than the trailing edge of the first read-out pulse 81. In order to prevent the charge-coupled device from the noise, the semiconductor substrate 30 should go up and be recovered in either horizontal or vertical blanking period.

As will be understood from the foregoing description, the charge-coupled device controlled by the method according to the present invention is free from the blooming phenomenon by virtue of shifting the voltage level at either of the photo shield film or the semiconductor substrate for reduction in the amount of the ineffectual electric charges.

Although particular embodiments of the present invention have been shown and described, it will be obvious to those skilled in the art that various changes and modifications may be made without departing from the spirit and scope of the present invention. For example, the transferring operations are as twice as large in number as the transferring stages, and the vertical shift registers can sweep the ineffectual electric charges as twice large as the maximum transferring charges For this reason, the biasing voltage level of the photo shield film 46 may be selected to be not greater than about 0.6 volt.

What is claimed is:

1. A controlling method for a charge-coupled device fabricated on a semiconductor substrate and comprising a plurality of photo sensing elements arranged in columns and operative to convert an optical radiation into electric charges, respectively, a multiple-stage horizontal shift register, an overflow drain, a plurality of multiple-stage vertical shift registers interleaved with said columns of said photo sensing elements and operative to transfer said electric charges to one of said multiple-stage horizontal shift register and said overflow drain, and a photo shield film provided over said photo sensing elements and having a plurality of windows located in such a manner as to allow said optical radiation to fall on the photo sensing elements, said controlling method comprising the steps of:

(a) accumulating effectual electric charges in the presence of said optical radiation into said photo sensing elements while applying a first voltage level to said photo shield film for promoting the production of said effectual electric charges while ineffectual electric charges are swept into said overflow drain through said multiple-stage vertical shift registers in response to a first driving pulse signal, and (b) transferring said effectual electric charges to said multiple-stage shift register while applying a second voltage level to said photo shield film for restricting the production of said ineffectual electric charges in said photo sensing elements.

2. A controlling method for a charge-coupled device as set forth in claim 1, in which said step a) starts with a first read-out pulse, and in which said step b) starts with a second read-out pulse, wherein said first driving pulse signal takes place between said first and second read-out signals.

3. A controlling method for a charge-coupled device as set forth in claim 1, in which said step (a) starts with a first read-out pulse, and in which said step (b) starts out pulse.

4. A controlling method for a charge-coupled device as set forth in claim 3, in which said second voltage level is applied to said photo shield film after the second read-out pulse.

5. A controlling method for a charge-coupled device as set forth in claim 4, in which a time period between an application of said first voltage level and the trailing edge of said first read-out pulse is not greater than a tenth of a time period for accumulating said effectual electric charges.

6. A controlling method for a charge-coupled device as set forth in claim 4, in which said first and second voltage levels are about +5 volts and −5 volts, respectively.

7. A controlling method for a charge-coupled device as set forth in claim 4, in which said ineffectual electric charges are swept through transferring operations in the presence of a first driving pulse signal, each of said ineffectual electric charges being transferred from a stage to the next stage in each of said transferring operations, and in which the number of said transferring operations is larger than the number of the stages of each vertical shift register.

8. A controlling method for a charge-coupled device as set forth in claim 7, in which the number of said transferring operations for said ineffectual electric charges is twice as large as the number of the stages of each vertical shift register, 9. A controlling method for a charge-coupled device as set forth in claim 8, the amount of each ineffectual electric charge transferred through each transferring operation is represented by the amount of a first transferring charge, and in which the amount of each ineffectual electric charge is not greater than twice of the amount of said first transferring charge.

10. A controlling method for a charge-coupled device as set forth in claim 9, in which the amount of each ineffectual electric charge is two third of the amount of said first transferring charge.

11. A controlling method for a charge-coupled device as set forth in claim 10, in which said first driving pulse signal is supplied to each of said multiple-stage vertical shift registers at about 800 KHz.

12. A controlling method for a charge-coupled device as set forth in claim 9, in which said effectual electric charges are transferred through transferring operations in the presence of a second driving pulse signal.

13. A controlling method for a charge-coupled device as set forth in claim 12, in which the amount of each effectual electric charge through each transferring operation is represented by the amount of a second transferring charge, and in which the amount of each effectual electric charge produced in each photo sensing element is not greater than the amount of said second transferring charge.

14. A controlling method for a charge-coupled device as set forth in claim 13, in which the maximum amount of each effectual electric charge is eight ninth of the amount of said second transferring charge.

15. A controlling method for a charge-coupled device fabricated on a semiconductor substrate and comprising a plurality of photo sensing elements arranged in columns and operative to convert an optical radiation into electric charges, respectively, a multiple-stage horizontal shift register, an overflow drain, a plurality of multiple-stage vertical shift registers, interleaved with said columns of said photo sensing elements and operative to transfer said electric charges to one of said multiple-stage horizontal shift register and said overflow drain, and a photo shield film provided over said photo sensing elements and having windows located in such a manner as to allow said optical radiation to fall on the photo sensing elements, said photo shield film being fixed to a certain voltage level, said controlling method comprising the steps of:

(a) shifting said semiconductor substrate from a first voltage level to a second voltage level for reducing the amount of ineffectual electric charges in said photo sensing elements, thereby sweeping a part of said ineffectual electric charges to said overflow drain, (b) shifting said semiconductor substrate from said second voltage level to said first voltage level to said first voltage level, (c) accumulating effectual electric charges in the presence of said optical radiation into said photo sensing elements while applying said first voltage level to said semiconductor substrate for promoting the production of said effectual electric charges while the residual ineffectual electric charges are swept into said overflow drain through said multiple-stage vertical shift registers in response to a first driving pulse signal, and (d) transferring said effectual electric charges to said multiple-stage horizontal shift register.

16. A controlling method for a charge-coupled device as set forth in claim 15, in which said step (c) starts with a first read-out pulse, and in which said step (d) starts with a second read-out pulse, wherein said first driving pulse signal takes place between said first and second read-out signals.

17. A controlling method for a charge-coupled device as set forth in claim 16, in which said first and second voltage levels are about +26 volts and about +9 volts, respectively.

* * * * *

UNITED STATES PATENT AND TRADEMARK OFFICE
CERTIFICATE OF CORRECTION

PATENT NO. : 4,989,095
DATED : Jan. 29, 1991
INVENTOR(S) : Takashi Iijima; Akiyoshi Kohno It is certified that error appears in the above-identified patent and that said Letters Patent is hereby corrected as shown below:

On the title page, under item [19], "Whitesel" should be --Iijima--; and
item [75] should read as follows:

--[75] Takashi Iijima; Akiyoshi Kohno,
both of Tokyo, Japan--.

Signed and Sealed this

Twenty-eighth Day of July, 1992

Attest:

DOUGLAS B. COMER

*Attesting Officer*    *Acting Commissioner of Patents and Trademarks*